United States Patent
Nowka et al.

[19]

[11] Patent Number: 6,026,146

[45] Date of Patent: Feb. 15, 2000

[54] AUTOMATED VOICE TERMINAL PROTOCOL IDENTIFICATION SYSTEM

[75] Inventors: Dennis R. Nowka, Thornton; Gene M. Uba, Broomfield, both of Colo.

[73] Assignee: Lucent Technologies Inc., Murray Hill, N.J.

[21] Appl. No.: 09/093,326

[22] Filed: Jun. 8, 1998

[51] Int. Cl.[7] .............................. H04M 1/24; H04M 3/08; H04M 3/22

[52] U.S. Cl. .................................. 379/27; 379/1; 379/34

[58] Field of Search .................................. 379/27, 32, 34, 379/387, 399, 411, 441, 442, 5, 6, 21, 24, 1

[56] References Cited

U.S. PATENT DOCUMENTS 5,757,680  5/1998  Boston et al. .............................. 379/21
5,937,031  8/1999  Stelman ........................................ 379/1

*Primary Examiner*—Curtis A. Kuntz
*Assistant Examiner*—Binh K. Tieu

[57] ABSTRACT

The automated voice terminal protocol identification system automatically identifies the nature of the voice terminal that is connected to the voice terminal test facility in a manner that ensures that neither the voice terminal nor the voice terminal test facility is subject to damage. This is accomplished by the application of a predetermined set of low potential test signals to the voice terminal under test, which set of low potential test signals is selected to elicit a response from the voice terminal under test that accurately identifies the protocol used by the voice terminal under test. If the result of this first test is inconclusive, successive set(s) of non-damaging test signals are applied to the voice terminal under test to precisely determine the type of voice terminal, prior to the application of the test sequence.

8 Claims, 1 Drawing Sheet

6,026,146

AUTOMATED VOICE TERMINAL PROTOCOL IDENTIFICATION SYSTEM

CROSS REFERENCE TO RELATED APPLICATIONS

This application is related to a U.S. patent application Ser. No.:?, titled "System for Automatic Voice Terminal Recognition and Dynamic Representation on a Test Facility", filed on the same date as the present application.

FIELD OF THE INVENTION

This invention relates to test facilities and in particular to a voice terminal protocol identification system that automatically identifies the nature of the voice terminal that is connected to the test facility in a manner that ensures that neither the voice terminal nor the test facility is subject to damage.

PROBLEM

It is a problem in the field of equipment test facilities to test a plurality of different products using a single test facility and a common test port. In the field of telephone communication systems, there are numerous voice terminals that are presently in use, which voice terminals have a common physical termination but incompatible electrical characteristics. In particular, there are three different communication protocols that share the same physical voice terminal connection in telephone switching systems. These protocols are: ATUETR; Digital Communication Protocol (DCP)—2 wire and 4 wire; and ISDN/NT2–4 wire. Each of these protocols relies on phantom power obtained from the signaling leads to provide the power to the voice terminal. However, the three protocols each have a unique phantom power arrangement and the connection of a voice terminal to a voice terminal test facility that is programmed for one of the other voice terminal protocols can result in damage to the voice terminal and/or the voice terminal test facility. Existing voice terminal test facilities rely on the operator to ensure that the voice terminal under test matches the protocol that is activated in the voice terminal test facility. However, errors in this determination are costly and all too frequent. Therefore, there is a need for a test facility that can automatically determine which voice terminal type is connected to the common test port of the voice terminal test facility prior to the application of power to the voice terminal under test.

SOLUTION

The above-described problems are solved and a technical advance achieved by the present automated voice terminal protocol identification system that automatically identifies the nature of the voice terminal it is connected to the voice terminal test facility in a manner that ensures that neither the voice terminal nor the voice terminal test facility is subject to damage. This is accomplished by the application of a predetermined set of low potential test signals to the voice terminal under test, which set of low potential test signals is selected to elicit a response from the voice terminal under test that accurately identifies the protocol used by the voice terminal under test. If the result of this first test is inconclusive, successive set(s) of non-damaging test signals are applied to the voice terminal under test to precisely determine the type of voice terminal, prior to the application of the test sequence.

The initial set of non-damaging test signals that are used in this system comprises low potential DC loop measurement signals to identify selected DC characteristics of the voice terminal under test. This initial test can distinguish among many of the voice terminal types and therefore eliminates the need for further testing. If these results are insufficient to distinguish between two voice terminal types that share common DC characteristics, then additional, secondary test operations can be initiated to further delimit the type of voice terminal that is connected to the common test port of the voice terminal test facility. In particular, the AC characteristics, such as signaling protocol typically differ among the various voice terminal types, and once the DC characteristics are determined, the voice terminal under test can be queried, in a power up or partially powered up mode, to determine the AC characteristics of the voice terminal under test. In this manner, the voice terminal test facility automatically identifies the type of voice terminal that is connected to the common test port prior to applying full power and the test sequence to the terminal under test. This initial investigation is conducted using low potential signals to thereby avoid the possibility that the probe will damage the voice terminal under test or elicit a response from the voice terminal under test that could damage the voice terminal test facility. A multi-tier sequence of such low potential signals is used to precisely determine the identity of the voice terminal under test.

DETAILED DESCRIPTION

Figure 2:
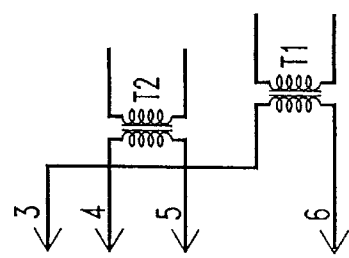
FIG. 2 illustrates the DC loop portion of an ISDN based voice terminal.

The automated voice terminal protocol identification system detects and identifies voice terminal products that are connected to a common test port on a voice terminal test facility. The inherent danger in testing a variety of products using a common test port is that the test facility operator can select the incorrect test, thereby subjecting the voice terminal to incorrect and potentially damaging signals. In particular, there are three different communication protocols that share the same physical voice terminal connection in telephone switching systems. These protocols are: ATLI-ETR; Digital Communication Protocol (DCP)—2 wire and 4 wire; and ISDN/NT2–4 wire. Each of these protocols relies on phantom power obtained from the signaling leads to provide the power to the voice terminal. However, the three protocols each have a unique phantom power arrangement and the connection of a voice terminal to a voice terminal test facility that is programmed for one of the other voice terminal protocols can result in damage to the voice terminal and/or the voice terminal test facility. The present automated voice terminal protocol identification system allows the test facility to automatically identify the connected voice terminal under test before any potentially damaging potentials are applied to the voice terminal by the test facility.

BASIC AUTOMATED VOICE TERMINAL PROTOCOL IDENTIFICATION SYSTEM

The automated voice terminal protocol identification system incorporates voice terminal detection hardware 101, 102 that includes a plurality of low potential signal application circuits 111, 113 that apply signals of low voltage and/or current to selected terminals of the common test port 130.

The low potential signals are selected to have signal characteristics that are non-damaging to any of the circuitry contained in any of the voice terminals that can be connected to the common test port 130 and, in particular, to these selected terminals. Resistive voltage application circuits 111, 113 are used in the preferred embodiment to produce the low potential signals that are connected to the selected terminals of the common test port 130. In response to a resistive non-damaging voltage potential being applied to these selected terminals, critical detection points are monitored for the presence or absence of predetermined signals. An analysis of the signal conditions on the terminals of the common test port 130 produces a voice terminal signature that uniquely identifies the one of the three protocols that are in use in the voice terminal that is connected to the common test port 130. Identification of the particular voice terminal is typically based upon the differences of DC loop configurations between the voice terminals. This determination is usually sufficient to distinguish among the terminals, but in addition, when the DC loop configurations of the voice terminals are identical, AC signal characteristics and/or communication protocols differ and represent a second tier of terminal identification. Therefore, an incremental process can be implemented, progressing from simple measurements to more complex measurements to precisely determine the identity of the voice terminal.

SYSTEM IMPLEMENTATION

Figure 1:
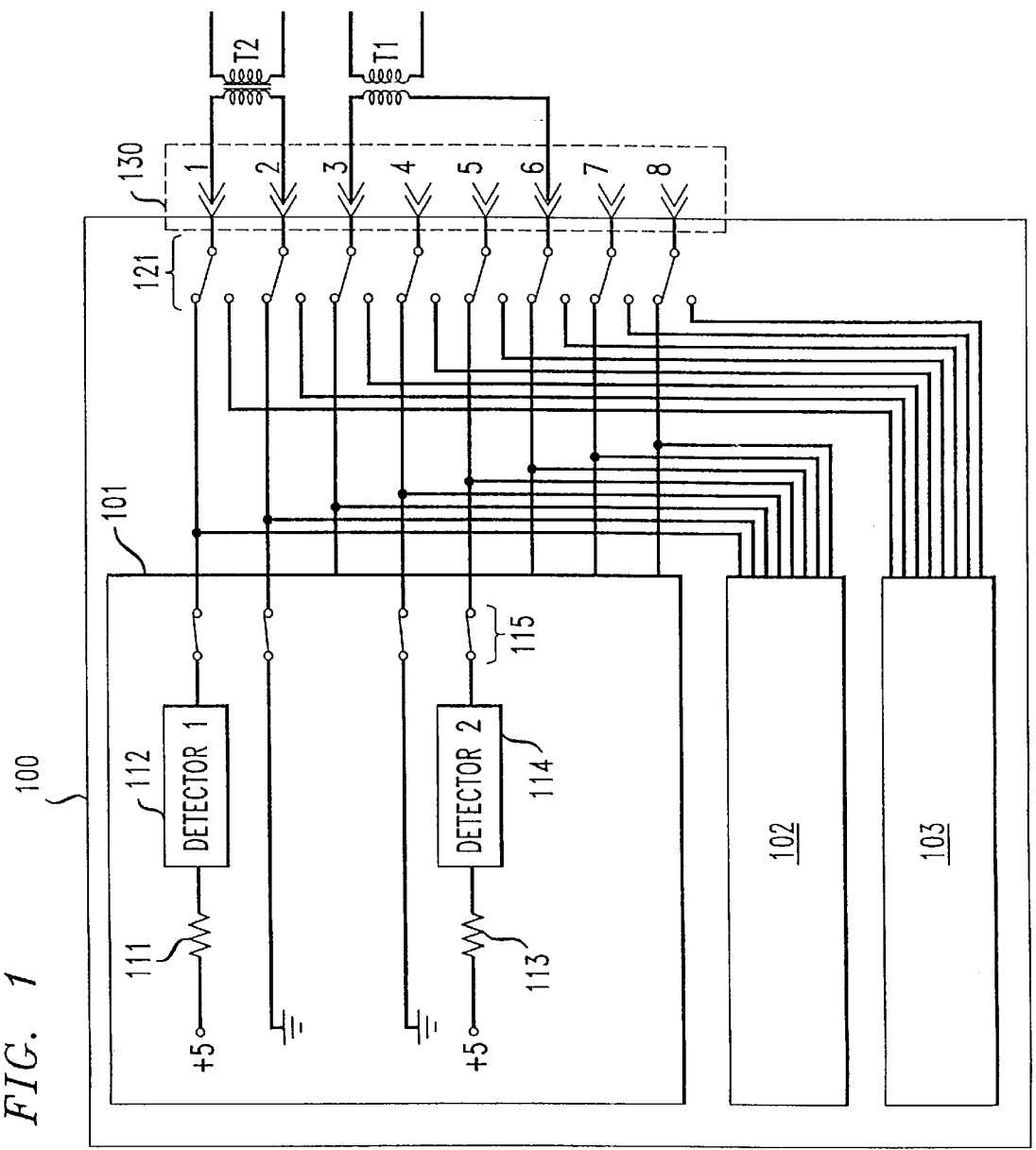
FIG. 1 illustrates the present automated voice terminal protocol identification system connected to the DC loop portion of a DCP based voice terminal.

FIG. 1 illustrates the present automated voice terminal protocol identification system connected to a DCP based voice terminal and FIG. 2 illustrates an ISDN based voice terminal. The voice terminal test system includes a common test port 130 that presents a common physical termination for all of the voice terminals that are tested by the voice terminal test system. The common test port 130 typically comprises a standard connector in the form of a telephone jack that serves to terminate the cable that extends from the voice terminal. The common test port 130 is shown as incorporating eight conductors, each terminating on a particular pin of the connector, and labeled 1–8 on FIGS. 1 and 2. The automated voice terminal protocol identification system 101, 102 is shown as being connectable to the common test port 130 via switch contacts 121 to thereby enable the voice terminal test system to selectively interconnect either the automated voice terminal protocol identification system 101, 102 or the test apparatus 107 contained in the voice terminal test system to the common test port 130. The automated voice terminal protocol identification system includes at least one tier 101 of voice terminal identification circuits and two such sets of circuits 101, 102 are shown herein. The first tier of test signals that are generated are DC loop signals that identify the DC characteristics of the voice terminal using low potential DC signals. The second tier of voice terminal identification circuits 102 comprise AC and/or protocol identification circuits.

The automated voice terminal protocol identification system identifies a single distinguishing characteristic or simple set of characteristics for each of the voice terminal protocols. In the example shown herein, the DC loop characteristics of the two voice terminal protocols differ and thereby represent a distinguishing characteristic. In order to minimize the time required to identify the voice terminal, the automated voice terminal protocol identification system generates a set of test signals that concurrently checks for the distinguishing characteristics of all of the voice terminals. The one test signal of the set that is identified as corresponding to the defined signal input of the present voice terminal defines the nature of the voice terminal. As can be seen from the DC loop wiring configurations for these two terminals, there is a unique attribute for these two terminals. These terminals share a common wiring characteristic of a first loop transformer T1 connected across terminals 3 and 6 of the eight conductor termination. Therefore, monitoring or testing these terminals is unnecessary to distinguish between the two terminal types. However, the second loop transformer T2 in the DCP terminal is connected across terminals 1 and 2, while the second loop transformer T2 in the ISDN terminal is connected across terminals 4 and 5. Therefore, by sensing the location of the second loop transformer T2 in a low potential manner distinguishes between these two terminal types.

The test operates by interconnecting the automated voice terminal protocol identification system to the terminals of the common test port 130 via switch contacts 121 to enable the low potential generating circuits to apply their predetermined test signals to the selected terminals of the common test port. A plurality of detector circuits 112, 114 are included in the automated voice terminal protocol identification system to monitor the response of the voice terminal under test to the application of these test signals to the selected terminals of the common test port 130. These detector circuits 112, 114 are illustrated as series connected elements and can comprise either voltage or current measuring circuits. The output signals produced by the detector circuits 112, 114 can be in the form of logical outputs shown below:

| Detector 1 output | Detector 2 output | Voice Terminal type |
| --- | --- | --- |
| 1 | 1 | DCP |
| 1 | 0 | ISDN |

The outputs from the detectors 112, 114 are applied to a voice terminal identification circuit that combines the received logic inputs to produce an output signal indicative of the type of voice terminal that is connected to the common test port. This output signal is transmitted to the remaining circuitry 107 in the voice terminal test system 100 to enable only the full power tests and test sequences that are appropriate for the identified voice terminal type.

This apparatus can also detect the absence of a voice terminal connected to the common test port when all of the logic outputs of the detectors correspond to zero output signals. The apparatus can also perform a self test to determine whether damaging voltages are present, such as transients present during power up or as a result of power line surges. If a power transient is detected by the detector circuits, the voice terminal tests system disconnects the physical connections to the common test port, thereby safeguarding the connected voice terminal.

SUMMARY

Thus, the voice terminal protocol identification system automatically identifies the nature of the voice terminal that is connected to the test facility in a manner that ensures that neither the voice terminal nor the test facility is subject to damage. The automated voice terminal protocol identification system identifies a single distinguishing characteristic or simple set of characteristics for each of the voice terminal protocols and, to minimize the time required to identify the voice terminal, the automated voice terminal protocol identification system generates a set of test signals that concurrently checks for the distinguishing characteristics of all of the voice terminals.

What is claimed:

1. An automated voice terminal protocol identification system that is connected to a test port, for automatically identifying a one of a plurality of voice terminal types that is connected to said test port, comprising:

means for applying a single set of low potential signals to at least two selected terminals of said test port;

means for monitoring at least one and less than all of said terminals of said test port to measure signals appearing thereon in response to application of said single set of low potential signals; and means, responsive to said single set of low potential signals and said measured signals, for determining an identity of one of a plurality of voice terminal types that is connected to said test port.

2. The automated voice terminal protocol identification system of claim 1 wherein said means for applying comprises:

at least one resistive voltage source that produces a low voltage low current signal to a corresponding one of said at least two selected terminals of said test port.

3. The automated voice terminal protocol identification system of claim 2 wherein said means for monitoring comprises:

at least one voltage detector that produces an indication of a predetermined voltage appearing on said corresponding one of said at least two selected terminals of said test port in response to application of said low voltage low current signal to said corresponding one of said at least two selected terminals of said test port.

4. The automated voice terminal protocol identification system of claim 3 wherein said voice terminal types differ in interconnection of DC loops contained therein to said selected terminals of said test port, said means for determining comprises:

means, responsive to said indication of a predetermined voltage appearing on said corresponding one of said at least two selected terminals of said test port in response to application of said low voltage low current signal to said corresponding one of said at least two selected terminals of said test port, for identifying a presence of a DC loop connected across two of said at least two selected terminals; and means for identifying a one of a plurality of voice terminal types that is connected to said test port based upon a correspondence of said presence of a DC loop connected across two of said at least two selected terminals and a corresponding one of a plurality of voice terminal types that contains a DC loop connected across two of said at least two selected terminals.

5. A method of operating an automated voice terminal protocol identification system that is connected to a test port, for automatically identifying a one of a plurality of voice terminal types that is connected to said test port, comprising the steps of:

applying a single set of low potential signals to at least two selected terminals of said test port;

monitoring at least one and less than all of said terminals of said test port to measure signals appearing thereon in response to application of said single set of low potential signals; and determining, in response to said single set of low potential signals and said measured signals, an identity of one of a plurality of voice terminal types that is connected to said test port.

6. The method of operating automated voice terminal protocol identification system of claim 5 wherein said step of applying comprises:

producing, using at least one resistive voltage source, a low voltage low current signal to a corresponding one of said at least two selected terminals of said test port.

7. The method of operating automated voice terminal protocol identification system of claim 6 wherein said step of monitoring comprises:

producing, using at least one voltage detector, an indication of a predetermined voltage appearing on said corresponding one of said at least two selected terminals of said test port in response to application of said low voltage low current signal to said corresponding one of said at least two selected terminals of said test port.

8. The method of operating automated voice terminal protocol identification system of claim 7 wherein said voice terminal types differ in interconnection of DC loops contained therein to said selected terminals of said test port, said step of determining comprises:

identifying, in response to said indication of a predetermined voltage appearing on said corresponding one of said at least two selected terminals of said test port in response to application of said low voltage low current signal to said corresponding one of said at least two selected terminals of said test port, a presence of a DC loop connected across two of said at least two selected terminals; and identifying a one of a plurality of voice terminal types that is connected to said test port based upon a correspondence of said presence of a DC loop connected across two of said at least two selected terminals and a corresponding one of a plurality of voice terminal types that contains a DC loop connected across two of said at least two selected terminals.

* * * * *